United States Patent [19]
Ogura et al.

[11] 4,362,320
[45] Dec. 7, 1982

[54] WEBBING DRIVING GUIDE

[75] Inventors: Mitsuhiro Ogura, Toyota; Toshio Saito, Nagoya, both of Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 191,495

[22] Filed: Sep. 29, 1980

[30] Foreign Application Priority Data

Oct. 8, 1979 [JP] Japan .......................... 54-140377[U]

[51] Int. Cl.³ ............................................ B60R 21/10
[52] U.S. Cl. .................................................. 280/802
[58] Field of Search .............. 280/802, 803, 804, 805, 280/808; 297/468, 469, 475; 24/230 A

[56] References Cited

U.S. PATENT DOCUMENTS

| | | | |
|---|---|---|---|
| 4,256,328 | 3/1981 | Thomas | 280/802 |
| 4,262,932 | 4/1981 | Motonami et al. | 280/802 |
| 4,268,067 | 5/1981 | Thomas | 280/802 |

*Primary Examiner*—Richard A. Bertsch
*Attorney, Agent, or Firm*—Stevens, Davis, Miller & Mosher

[57] ABSTRACT

A webbing driving guide, used in a seatbelt system wherein one end of an occupant restraining webbing is secured to a door of a vehicle, has a roller for moving the intermediate portion of the webbing forward in the vehicle along the door while the door is opened. The roller is connected to driving means provided in the door by way of an arm and a bracket. The bracket is supported by the driving device in such a manner that the bracket is disposed at a position being a distance of 1/5 to 2/5 the effective webbing supporting length apart from one end of the roller and the bracket is secured to the driving means through a mounting bolt being twisted at a predetermined angle with the axis of the roller. Hence, the outer webbing does not move greatly in the widthwise direction thereof when the outer webbing moves in the longitudinal direction thereof in a condition of being wound on the roller.

15 Claims, 3 Drawing Figures

WEBBING DRIVING GUIDE

BACKGROUND OF THE INVENTION

1. Field of the Invention

This invention relates to a webbing driving guide for moving the intermediate portion of a webbing, which is used in an automatic fastenin type seatbelt system for automatically fastening a restraining webbing to an occupant.

2. Description of the Prior Art

Heretofore, there have been used seatbelt systems capable of automatically fastening a webbing to an occupant after he is seated. In the seatbelt system of the type described, one end of the occupant restraining webbing is engaged with a door of a vehicle, and the other end thereof is secured to substantially the central portion of the vehicle, whereby the intermediate portion of the webbing is adapted to move forward in the vehicle in accordance with the opening action of the vehicle door. In order to enlarge a space formed between the intermediate portion of the webbing and an occupant's seat for entering or leaving the vehicle, a webbing driving guide is provided on which the intermediate portion of the webbing is wound and which moves along the door. The webbing driving guide is moved along the door by a driving force of an electric motor or the like, whereby the intermediate portion of the webbing is further moved forward in the vehicle.

However, the webbing driving guide is of such an arrangement that the webbing is wound on a contact roller in the webbing driving guide and, when the webbing driving guide is moved, a section of the intermediate portion of the webbing in contact with the contact roller is transferred in the longitudinal direction of the webbing. In that case, a component of the tension is generated in transverse direction of the webbing, whereby the webbing is moved in the widthwise direction thereof, i.e., the axial direction of the contact roller and is deviated to one side of the webbing driving guide, with the result that there are presented such disadvantages that a high resistant force against the longitudinal movement of the webbing is generated in the contact section of the intermediate portion of the webbing, the webbing comes into contact with the webbing driving guide, thereby causing damage to the selvedge of the webbing, and the like.

SUMMARY OF THE INVENTION

This invention has been developed to obviate the abovedescribed disadvantages of the prior art and has as its object the provision of a webbing driving guide in which a webbing is not deviated in the widthwise direction thereof when a section of the intermediate portion of the webbing in contact with a contact roller in the webbing driving guide is moved in the longitudinal direction of the webbing.

The webbing driving guide according to the present invention is secured to driving means in such a manner that the axis of the contact roller is twisted at a predetermined angle with respect to the axis of a mounting bolt of the driving means, and a connecting bracket of the webbing driving guide is secured to the driving means in a manner to be twisted at a perdetermined angle with the axis of the contact roller and disposed at a position being a distance of 1/5 to 2/5 the effective webbing supporting length apart from one end of the contact roller, so that a deviation force generated in the webbing in the widthwise direction thereof can be eliminated.

Description will hereunder be given of an embodiment of the present invention with reference to the drawings.

DESCRIPTION OF THE PREFERRED EMBODIMENTS

Figure 1:
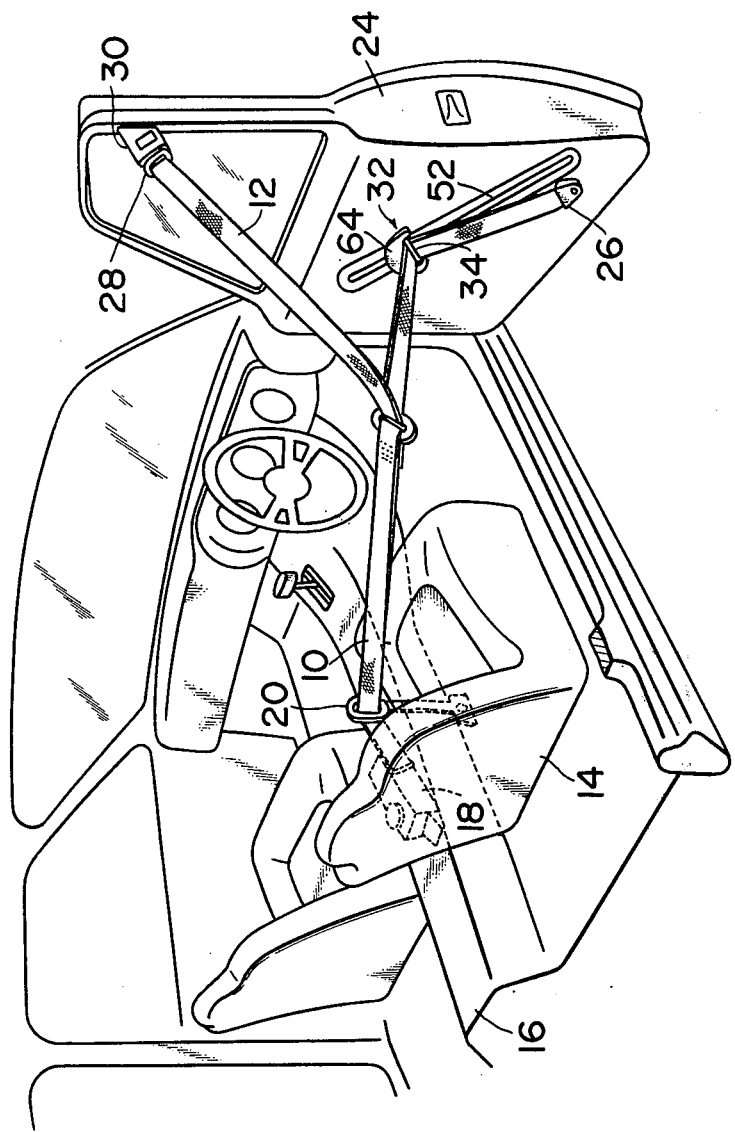
FIG. 1 is a perspective view showing the seatbelt system in the dooropened condition, to which is applied the webbing driving guide according to the present invention.

The seatbelt system as shown in FIG. 1 is of such an arrangement that an inner webbing 10 and an outer webbing 12 are automatically fastened to or unfastened from an occupant seated in seat 14.

One end of the inner webbing 10 is wound into a retractor 18 mounted on a tunnel portion 16 raised substantially at the center of a vehicle. The retractor 18 winds up the inner webbing 10 by its biasing force and incorporates therein an inertia lock mechanism for suddenly stopping the windout of the inner webbing 10 in an emergency of the vehicle.

The intermediate portion of the inner webbing 10 passes through a guide ring 20 erected at the compartment's center side of the seat 14, and a ring joint 22 is secured to the forward end of the inner webbing 10. When the occupant enters or leaves the vehicle, the guide ring 20 is rotated forward in the vehicle to recede the inner webbing 10 from the occupant. However, during normal running condition of the vehicle, the guide ring 20 is rotated rearward in the vehicle to fasten the inner webbing 10 to the occupant.

On the other hand, one end of the outer webbing 12 is engaged with the lower portion of a vehicle door 24 through an anchor plate 26, the intermediate portion of which extends through the ring joint 22, and the forward end of which is secured to a tongue plate 28. The tongue plate 28 is engaged with a buckle device 30 solidly secured to the upper portion of the door 24.

In consequence, these inner and outer webbings 10 and 12, when the door 24 is opened or closed, are adapted to move forward or rearward in the vehicle in accordance with the opening or closing circularly arcuate motion of the door 24.

These inner and outer webbinsg 10 and 12 are arranged to bring the occupant into a three-point seatbelt fastened condition. However, in order to bring the occupant into a two-point seatbelt fastened condition, a single webbing should be arranged such that one end of the single webbing is engaged with the vehicle door 24 through the anchor plate 26 and the other end thereof is wound into the retractor 18.

The intermediate portion of the outer webbing 12 between the anchor plate 26 and the ring joint 22 is wound on a roller 34 of a webbing driving guide 32.

Figure 2:
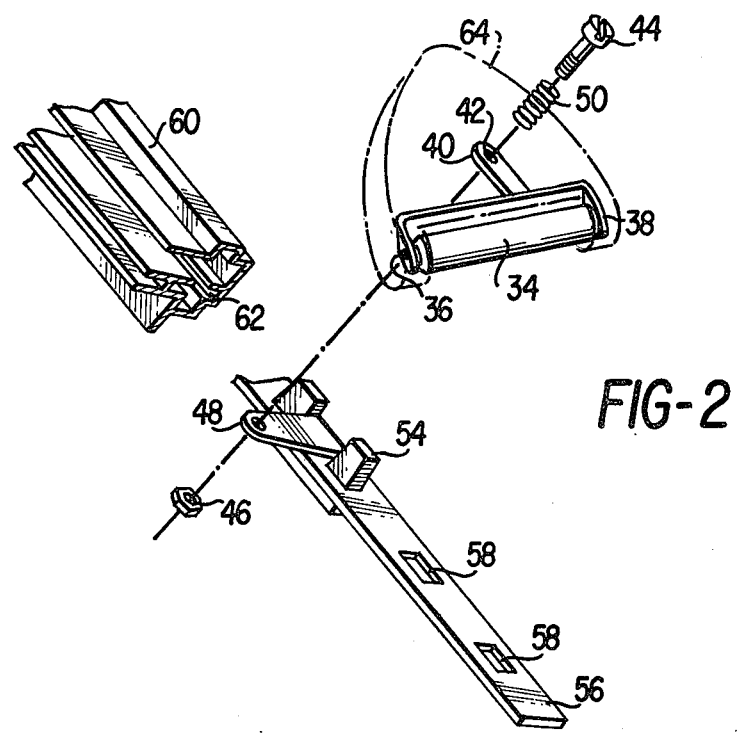
FIG. 2 is a disassembled perspective view showing the webbing driving guide in the mounted condition.
Figure 3:
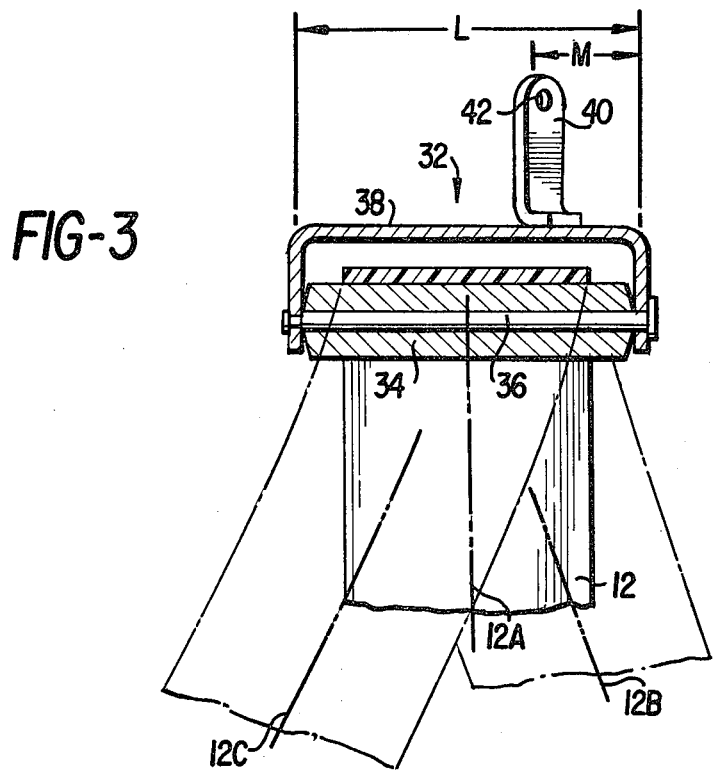
FIG. 3 is a sectional view showing the webbing driving guide.

As in detail shown in FIGS. 2 and 3, in the webbing driving guide 32, the roller 34 is pivotally supported by a pivot 36 to be rotatable, and opposite ends of the pivot 36 are supported by a letter 'U' shaped arm 38. A connecting bracket 40 is solidly secured to the intermediate portion of the letter 'U' shaped arm 38. The webbing driving guide 32 is secured to the forward end portion of a slider 48 through a mounting hole 42 penetrated at the forward end portion of the connecting bracket 40 by means of a mounting bolt 44 and a mounting nut 46. Here, a clearance of a predetermined value is provided between the mounting hole 42 and the mounting bolt 44, so that the webbing driving guide 32 is rotatable relative to the mounting bolt 44. Additionally, a compression coil spring 50 is confined between the connecting bracket 40 and the mounting bolt 44, so that no such relative rotation as described above should occur due to slight vibrations of the vehicle.

As shown in FIG. 1, the slider 48, to which the webbing driving guide 32 is secured, is received in a slit 52 penetratingly provided in the door 24 along the inner side thereof. The slit 52 is obliquely disposed from the upper forward portion of the door 24 to the lower rear portion thereof.

The slider 48 is solidly secured to a flexible tape 56 through a mounting block 54. The flexible tape 56 is penetratingly provided therein with a plurality of openings 58 in the longitudinal direction thereof at suitable regular intervals. The mounting block 54 penetrates through the openings 58, whereby the slider 48 is secured to the flexible tape 56.

Furthermore, the flexible tape 56 is adapted to slide along a tape guide groove 62 of a guide rail 60 provided in the vehicle door, and a sprocket wheel rotated by an electric motor, not shown, provided in the door comes into meshing engagement with the openings 58, whereby the flexible tape 56 is moved by the driving force of the motor along the tape guide groove 62 in the longitudinal direction of the flexible tape 56.

Here, the motor, not shown, is designed such that, when the vehicle door 24 is opened, the slider 48 is moved along the slit 52 forward in the door 24, and, when the door 24 is closed, the slider 48 is moved along the slit 52 rearward in the door 24.

In the webbing driving guide 32, the connecting bracket 40 is secured to the letter 'U' shaped arm 38 in a manner to be deviated from the center of the letter 'U' shaped arm 38. More particularly, as shown in FIG. 3, a span L, over which the letter 'U' shaped arm 38 substantially supports the roller 34, has an effective webbing supporting length, on which the intermediate portion of the webbing is wound through the roller 34, and the connecting bracket 40 is designed to be disposed at a mounting position being a distance M of 1/5 to 2/5 the effective webbing supporting length L apart from one end thereof.

Furthermore, the connecting bracket 40 is secured to the letter 'U' shaped arm 38 in a manner to be twisted at a predetermined angle therewith, and hence, the axis of the mounting hole 42 intersects the axis of the roller 34 at the predetermined angle. Due to this intersecting angle, the webbing driving guide 32 secured to the inner side of the door is inclined such that the lower portion of the roller 34 (the end farthest from the bracket 40) recedes from the inner sie surface of the door 24 and the upper end portion (the end closest to the bracket 40) approaches the inner side surface of the door 24. Additionally, in the drawing, reference numeral 64 denotes a dust cover for the webbing driving guide 32.

Description will hereunder be given of operation of this embodiment with the arrangement as described above. When the occupant opens the door 24 to enter the vehicle, the inner webbing 10 is wound out against the biasing force of the retractor 18, whereby the inner and outer webbings 10 and 12 are moved forward in the vehicle in accordance with the opening circularly arcuate motion of the door 24. Simultaneously with this, the motor, sensing the opening motion of the door, drives the flexible tape 56 to move the slider 48 along the door 24 forward in the vehicle, whereby the intermediate portion of the outer webbing 12 is bent forward in the vehicle as shown in FIG. 1, so that the webbings 10 and 12 are moved further greatly forward in the vehicle, thus forming a sufficient space for the occupant to enter the vehicle between the seat 14 and the webbings 10, 12.

During the movement of the webbing driving guide 32, the intermediate portion of the outer webbing 12 moves relative to the webbing driving guide 32, rotating the roller 34. Here, the connecting bracket 40 is secured to the latter 'U' shaped arm 38 in a manner to be twisted at the predetermined angle therewith, whereby the axis of the roller 34 is substantially in a vertical position, so that the longitudinal axis 12A of the webbing 12 turned back at the roller 34 becomes substantially perpendicular to the axis of the roller 34 (Refer to FIG. 3), with the result that, in the case the webbing 12 moves while being wound on the roller 34, the webbing 12 does not move in the widthwise direction at the contact portion thereof. Additionally, in FIG. 3, reference numerals 12B and 12C indicate the axis of the webbing being deviated from the regular axis 12A. If the webbing 12 moves in the longitudinal direction thereof in this condition, then the webbing 12 moves in the axial direction of the roller 34 at the contact portion thereof an comes into abutting contact with the letter 'U' shaped arm 38.

Furthermore, even in the case the axis of the mounting hole 42 of the bracket 40 is twisted at the predetermined angle with respect to the axis of the roller 34 as described above, the asix 12A of the webbing 12 may become deviated to a certain extent from the line perpendicular to the axis of the roller 34, so that the webbing 12 may slip upward in FIG. 1 at the contact portion thereof. However, in this embodiment, the connecting bracker 40 is secured to the letter 'U' shaped arm 38 in a manner to be disposed at the position being deviated from the center of the arm 38, so that the contact portion of the webbing 12 can be reliably prevented from moving in the widthwise direction of the webbing while the webbing 12 moves in the longitudinal direction thereof. As a result, the selvedge of the webbing hardly comes into contact with the letter 'U' shaped arm 38, so that frictional resistance during movement can be reduced and the selvedge can be protected from damages.

Subsequently, when the occupant closes the door upon entering the vehicle, the webbing is moved rearward in the vehicle in accordance with the closing circularly arcuate motion of the door and the excess portion of the inner webbing 10 is wound into the retractor 18, and further due to rotation of the motor in the reversed direction, the webbing driving guide 32 is moved to the lower rear portion of the door 24, so that the webbings 10 and 12 can be positively fastened to the occupant.

During the movement of the webbing driving guide 32 in this case too, the outer webbing 12 hardly comes into contact with the letter 'U' shaped arm 38 similarly to the case of opening the door, so that frictional resistance of the webbing during its movement can be reduced.

Furthermore, in an emergency of the vehicle such as a collision, the retractor 18 senses the acceleration of the vehicle to stop the windout of the inner webbing 10, so that the occupant can be reliably restrained in a three-point seatbelt fastened condition by the inner and outer webbings 10 and 12, thereby securing the occupant in safety.

As has been described hereinabove, the webbing driving guide according to the present invention is of such an arrangement that the connecting bracket of the webbing driving guide is secured to the driving device in a manner to be twisted at a predetermined angle with the axis of the contact roller and disposed at the position being a distance of 1/5 to 2/5 the effective webbing supporting length apart from one end of the contact roller, and hence, can offer such outstanding advantages that the webbing is prevented from moing in the widthwise direction of the webbing during the movement of the webbing, whereby frictional resistance during the movement of the webbing is reduced, so that damages caused to the webbing can be reduced.

What is claimed is:

1. A webbing driving guide for use in a seatbelt system having a webbing, at least one end of which is engaged with a door, and another end of which is engaged with a retractor, said webbing being movable forward or rearward in a vehicle in accordance with the respective opening or closing action of said door whereby an occupant of said vehicle is free to enter and leave said vehicle, comprising:
    (a) suspending means for suspending an intermediate portion of said webbing on the side of said door, said suspending means including,
    a roller, on which said webbing is wound,
    an arm supporting said roller,
    a bracket secured to said arm at a position apart from one end of said roller by a distance of 1/5 to 2/5 of a length which is defined by the length of said roller which effectively supports said webbing in a lateral direction of said webbing, said bracket being twisted at a predetermined angle so that an end of said roller farthest from said bracket recedes from an inner side surface of said door;
    (b) supporting means for supporting said suspending means at said door;
    (c) driving means for driving said supporting means to drive said suspending means along a guide member on said door; and
    (d) connecting means for connecting said suspending means to said supporting means.

2. A webbing driving guide as set forth in claim 1, wherein said connecting means comprises a nut and a bolt by which said bracket is connected to said supporting means.

3. A webbing driving guide as set forth in claim 1 or 2, wherein said suspending means is pivotable relative to said supporting means.

4. A webbing driving guide as set forth in claim 2, further comprising a resilient member confined between said bracket and a flange of said bolt.

5. A webbing driving guide as set forth in claim 3, further comprising a resilient member confined between said bracket and a flange of said bolt.

6. A webbing driving guide as set forth in claim 1 or 2, wherein said driving means includes a flexible tape to which said supporting means is connected, said flexible tape being movable along said guide member whereby said suspending means is moved by said flexible tape along said guide member.

7. A webbing driving guide as set forth in claim 3, wherein said driving means includes a flexible tape to which said supporting means is connected, said flexible tape being movable along said guide member whereby said suspending means is moved by said flexible tape along said guide member.

8. A webbing driving guide as set forth in claim 4, wherein said driving means includes a flexible tape to which said supporting means is connected, said flexible tape being movable along said guide member whereby said suspending means is moved by said flexible tape along said guide member.

9. A webbing driving guide as set forth in claim 1 or 2, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said inner webbing being provided with a ring joint through which said outer webbing is connected to said inner webbing.

10. A webbing driving guide as set forth in claim 3, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said inner webbing being provided with a ring joint through which said outer webbing is connected to said inner webbing.

11. A webbing driving guide as set forth in claim 4, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said inner webbing being provided with a ring joint through which said outer webbing is connected to said inner webbing.

12. A webbing driving guide as set forth in claim 5, wherein said webbing includes an inner webbing and an outer webbing, one end of said outer webbing being secured to a lower portion of said door, the other end of said outer webbing being secured to an upper portion of said door, on end of said inner webbing being wound into said retractor, the other end of said inner webbing being provided with a ring joint through which said outer webbing is connected to said inner webbing.

13. A webbing driving guide as set forth in claim 6, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said webbing being provided with a ring joint through which said outer webbing is connected to said inner webbing.

14. A webbing driving guide as set forth in claim 7, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said inner webbing being provided with a ring joint through which said outer webbing is connected to said inner webbing.

15. A webbing driving guide as set forth in claim 8, wherein said webbing includes an inner webbing and an outer webbing, one end of said outer webbing being secured to a lower portion of said door, the other end of said outer webbing being secured to an upper portion of said door, one end of said inner webbing being wound into said retractor, the other end of said inner webbing being provided with a ring joint through which said outer webbing is connected to said inner webbing.

* * * * *